US010630790B2

(12) United States Patent
Riviello et al.

(10) Patent No.: US 10,630,790 B2
(45) Date of Patent: *Apr. 21, 2020

(54) SYSTEMS AND METHODS FOR ABANDONMENT DETECTION AND MITIGATION

(71) Applicant: Comcast Cable Communications, LLC, Philadelphia, PA (US)

(72) Inventors: John Riviello, Mount Laurel, NJ (US); Daniel Freiman, King of Prussia, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,351

(22) Filed: Apr. 17, 2017

(65) Prior Publication Data
US 2018/0069938 A1 Mar. 8, 2018

Related U.S. Application Data

(63) Continuation of application No. 13/829,879, filed on Mar. 14, 2013, now Pat. No. 9,667,730.

(51) Int. Cl.
*H04L 29/08* (2006.01)

(52) U.S. Cl.
CPC .............. *H04L 67/22* (2013.01); *H04L 67/02* (2013.01)

(58) Field of Classification Search
CPC ......... H04L 67/22; H04L 67/02; H04L 29/06; H04L 67/12; H04L 67/20; G06Q 30/02; G06Q 30/0277
See application file for complete search history.

(56) References Cited

U.S. PATENT DOCUMENTS

| | | | | | |
|---|---|---|---|---|---|
| 6,064,172 | A | * | 5/2000 | Kuznetsov | G01R 31/346 318/434 |
| 8,908,864 | B2 | * | 12/2014 | Nooren | H04L 63/1441 380/270 |
| 10,194,344 | B1 | * | 1/2019 | Sitaram | H04W 28/0205 |
| 2010/0023398 | A1 | * | 1/2010 | Brown | G06Q 30/02 705/14.49 |
| 2012/0192080 | A1 | * | 7/2012 | Lloyd | G06F 17/30905 715/744 |
| 2012/0320416 | A1 | * | 12/2012 | Mbenkum | G06F 16/9562 358/1.15 |
| 2012/0324337 | A1 | * | 12/2012 | Mbenkum | G06F 17/241 715/234 |
| 2012/0324392 | A1 | * | 12/2012 | Mbenkum | G06Q 10/101 715/776 |
| 2014/0129697 | A1 | * | 5/2014 | Tuovinen | H04L 43/106 709/224 |
| 2014/0231085 | A1 | * | 8/2014 | Zediker | E21B 29/02 166/288 |
| 2018/0367847 | A1 | * | 12/2018 | Brinkley | H04N 21/44222 |

* cited by examiner

*Primary Examiner* — Sargon N Nano
(74) *Attorney, Agent, or Firm* — Ballard Spahr LLP

(57) ABSTRACT

Systems and methods for presenting information are disclosed. One aspect comprises receiving a request for information. First data can be provided in response to the request if a parameter is equal to or exceeds a comparator element, wherein the parameter relates to one or more of abandoned data transmissions and completed data transmissions. Second data can be provided in response to the request if the comparator element exceeds the parameter.

20 Claims, 7 Drawing Sheets

SYSTEMS AND METHODS FOR ABANDONMENT DETECTION AND MITIGATION

CROSS REFERENCE TO RELATED PATENT APPLICATION

This application is a Continuation of U.S. Non-Provisional application Ser. No. 13/829,879 filed Mar. 14, 2013, herein incorporated by reference in its entirety.

BACKGROUND

Certain users and/or devices may abandon download of a particular data set, such as a webpage, prior to receiving the complete data set. Larger data sets may take longer to download than a user is willing to wait. As such, the user may choose to request an alternative data set. One solution to minimize abandonment is to decrease the loading time of the data set for all users, which is usually at the expense of features found in the complete data set. Additionally, some websites may return different data sets depending on the device type being used, but this does not take into account real-time device performance. These and other shortcomings are identified and addressed by the disclosure.

SUMMARY

It is to be understood that both the following general description and the following detailed description are exemplary and explanatory only and are not restrictive, as claimed. In some aspects, provided are methods and systems for identifying an abandonment risk. The methods and systems described herein, in one aspect, distinguish between classifications of one or more users and/or devices in order to deliver a customized experience for each class of user and/or device. As an example, the methods and systems described herein can determine whether a user and/or device is an abandonment risk and can provide a custom experience based upon such determination.

In an aspect, a method can comprise receiving a request for information. First data can be provided in response to the request if a parameter is equal to or exceeds a comparator element, wherein the parameter relates to one or more of abandoned data loads and completed data loads (e.g., based on historical data or analysis). Second data can be provided in response to the request if the comparator element exceeds the parameter.

In another aspect, a method can comprise receiving information relating to one or more of initiated data loads, abandoned data loads, and completed data loads. A parameter can be modified based upon the received information. The parameter can be compared to a comparator element. A first data can be requested if the parameter is equal to or exceeds the comparator element. A second data can be requested if the comparator element exceeds the parameter (e.g., the parameter is less than the comparator element or below a threshold).

In yet another aspect, a method can comprise transmitting a request for information. First data can be received in response to the request. At least a portion of the first data can be loaded. A parameter relating to the first data can be determined. The parameter can be compared to a comparator element. The loading of the first data can be continued if the parameter is equal to or exceeds the comparator element. If the comparator element exceeds the parameter (e.g., the parameter is less than the comparator element or below a threshold), second data can be received.

In a further aspect, a method can comprise receiving a first request for information associated with an identifier, wherein the information has a first form and a second form. The first form of the information can be provided in response to the first request. A second request for information associated with the identifier can be received. The second form of the information can be provided if a source of the second request is determined to be an abandonment risk.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
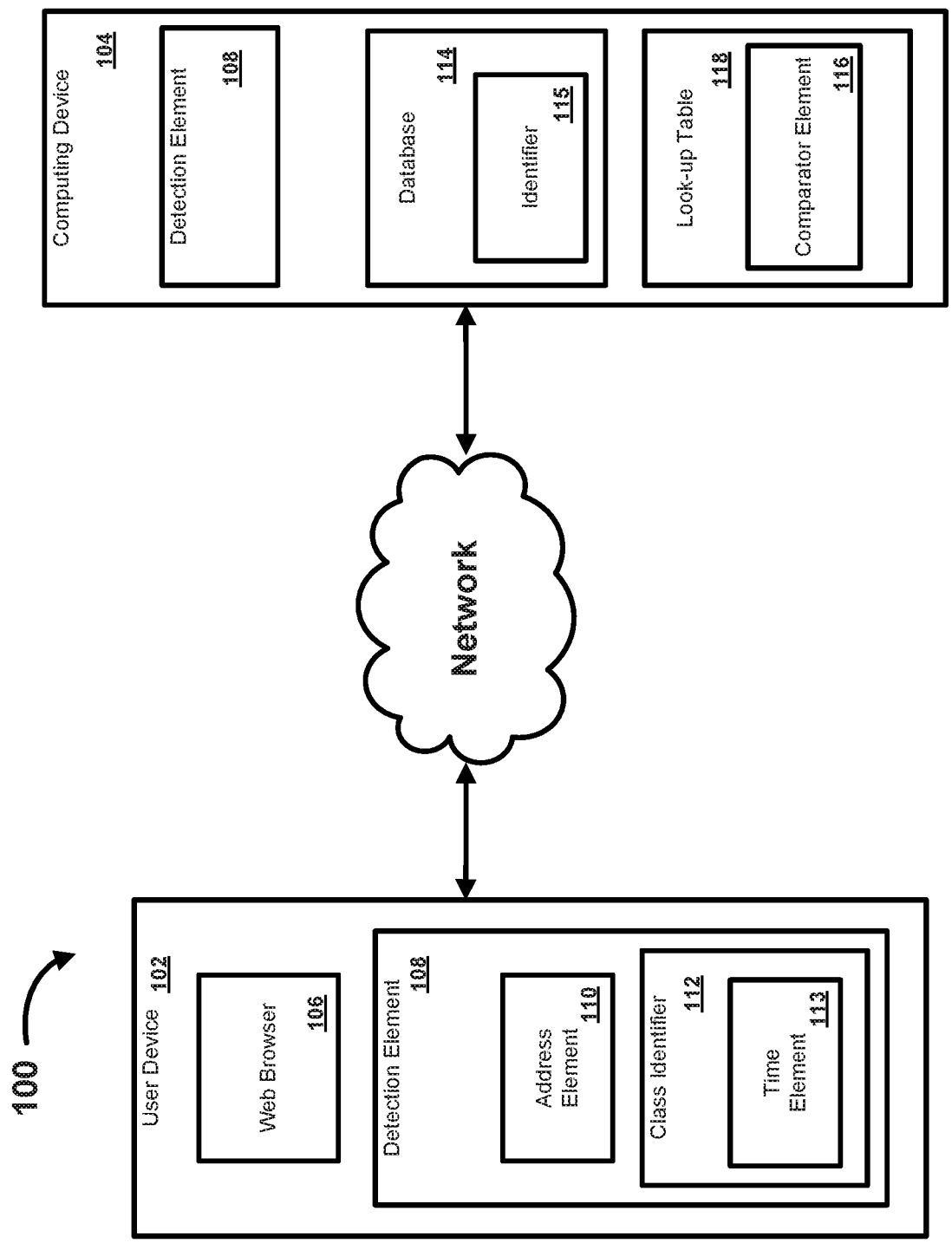
FIG. 1 is a block diagram of an example network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for identifying an abandonment risk. The methods and systems described herein, in one aspect, distinguish between classifications of one or more users and/or devices in order to deliver a customized experience for each class of user and/or device. As an example, the methods and systems described herein can determine whether a user and/or device is an abandonment risk and can provide a custom experience based upon such determination. As a further example, an alternative form of data can be provided to users that are identified as an abandonment risk.

In an aspect, a system can be configured to distinguish a classification of user and/or device in order to deliver a customized experience for each class of user. As an example, one or more users and/or devices can be classified based on a level of risk of abandonment. As a further example, FIG. 1 illustrates various aspects of an exemplary system and network in which the present methods and systems can operate. The present disclosure relates to systems and methods for determining abandonment risk. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system and network 100 can comprise a user device 102 in communication with a computing device 104 such as a server, for example. The computing device 104 can be disposed locally or remotely relative to the user device 102. As an example, the user device 102 and the computing device 104 can be in communication via a private or public network such as the Internet. Other forms of communications can be used such as wired and wireless telecommunication channels, for example.

In an aspect, the user device 102 can be an electronic device such as a computer, a smartphone, a laptop, a tablet, a set top box, or other device capable of communicating with the computing device 104. As an example, the user device 102 can comprise a web browser 106 for providing an interface to a user to interact with the user device 102 and/or the computing device 104. The web browser 106 can be any interface for presenting information to the user and receiving a user feedback such as Internet Explorer, Mozilla Firefox, Google Chrome, Safari, or the like. Other software, hardware, and/or interfaces can be used to provide communication between the user and one or more of the user device 102 and the computing device 104. As an example, the web browser 106 can request or query various files from a local source and/or a remote source.

In an aspect, the user device 102 can comprise a detection element 108 for determining one or more parameters, such as initiated data loads, complete data loads, abandoned data loads, web navigation, and the like. In an aspect, the detection element 108 can be configured to, among other things: authenticate the user device 102 with a particular network; install drivers; configure a modem; setup a wired or wireless Local Area Network (LAN); secure an operating system; configure browser provider-specifics; provision electronic mail (e.g. create mailboxes and aliases); configure electronic mail; install additional support software; install add-on packages; and the like. As an example, the detection system 108 can be configured to provision and/or monitor one or more address elements 110 and a class identifier 112 to the user device 102.

In an aspect, the address element 110 can be a uniform resource identifier (URI) (e.g., a uniform resource locator (URL)), a network address, an Internet address, or the like. As an example, the address element 110 can be relied upon to establish a communication session between the user device 102 and the computing device 104. As a further example, the address element 110 can be any identifier to distinguish the user device 102 from other devices intercommunicating with the computing device.

In an aspect, the class identifier 112 can be any identifier, token, character, string, or the like, for differentiating one user or user device from another user or user device. In an aspect, the class identifier 112 can comprise a time element 113 such as a date, a time, or combination thereof. As an example, the class identifier 112 can comprise an identifier other than a date. For example, the class identifier 112 can comprise a value, token, character, string, or the like representing a particular classification of user that is not dependent on time or date. As another example, the classification of user can be based upon a pre-defined user level, user authority, user history, user location, or other classification or distinction. As a further example, the class identifier 112 can relate to an abandonment risk of an associated device and/or user. For example, a first class identifier can represent users that tend to abandon a data load, whereas a second class identifier can represent users that tend to permit a data load to complete. In an aspect, the class identifier 112 can be persistently stored. As an example, the class identifier 112 can be persistently stored on or locally to the user device 102.

In another aspect, the class identifier 112 can comprise a cookie. As an example, when a page header is loaded, the cookie can be incremented. When the page is completely loaded, the cookie can be decremented. Thus, abandonment can be tracked by the gradual increase of a value of the cookie. The cookie can be read on each request for data and if the value is above a threshold (e.g., numerical value, string value, bits, etc.), the associated user and/or device can be identified as an abandonment risk. As such, instead of returning the normal data set, an alternative data set, such as another version or form of the data set, can be presented to the user and/or device. Other mechanisms can be used to classify and determine abandonment risk such as user history, preferences, network conditions, and the like. The class identifier 112 (e.g., cookie) can be reset based upon a triggering event (e.g., error detection, software update, new user identification, etc.) or by a user such as service administrator. Other reset mechanisms can be used to modify the class identifier 112.

In an aspect, the computing device 104 can be a server for communicating with the user device 102. In another aspect, the computing device 104 can comprise a detection element such as the detection element 108. As an example, the computing device 104 can manage and/or monitor the intercommunication between the user device 102 and the database 114 for sending and receiving data therebetween. In an aspect, the database 114 can store a plurality of data sets (e.g. information sets, files, media, web pages, etc.). As an example, the user device 102 can request an information set from the database 114. As a further example, the user device 102 can retrieve one or more information sets from the database 114. In another aspect, one or more identifiers 115 can be associated with one or more of the information sets stored on and/or retrievable by the computing device 104. As an example, one or more identifiers 115 can comprise a uniform resource identifier (URI) (e.g., a uniform resource locator (URL)), a network address, an Internet address, or the like. As a further example, the one or more identifiers 115 can direct the web browser 106 to request or query a particular file or webpage. The requested file can be stored locally to the computing device 104 or remotely, for example.

In an aspect, the one or more identifiers 115 can be configured as a "Home Page" for the web browser 106, wherein upon each startup of the web browser 106, the one or more identifiers 115 requests a particular file or webpage associated with the "Home Page" and presents the requested file or webpage to the user. As an example, the one or more identifiers 115 can be persistently stored. As a further example, the one or more identifiers 115 can be persistently stored on or locally to one or more of the computing device 104 and the user device 102.

In an aspect, the user device 102 can be in communication with software to consume various media types. As an example, the software can be executed on the user device 102. The software can provide the various media types to the user device 102 directly or establish a connection to a source of the media types, such as the computing device 104 or database 114, for example. As a further example, the software can be executed remotely relative to the user device 102. In an aspect, the media type presented on the user device 102 can be based upon the class identifier 112 associated with the user or user device 102.

In an aspect, the computing device 104 can comprise a comparator element 116. It is understood that the comparator element 116 can be stored locally or remotely relative to the computing device 104. As an example, the comparator element 116 can be stored in the database 114. As a further example, the comparator element 116 can be stored in a look-up table 118. In an aspect, the comparator element 116 can comprise one or more of a function, value, token, character, character string, label, classifier, pre-determined time period, pre-determined date, time range, finite expression, or the like. The comparator element 116 can comprise single or multiple functions, characters, character strings, ranges, thresholds, values, and the like, for comparison. The comparator element 116 can be based upon a pre-defined function, user level, user authority, user history, user location, or other classification or distinction.

As an example, one or more of the user device 102 and the computing device 104 can be configured to compare the class identifier 112 to the comparator element 116 to determine whether the class identifier 112 is within the comparator element 116. In an aspect, the class identifier 112 can be compared to the comparator element 116 to determine if the class identifier 112 matches at least a portion of the comparator element 116. In an aspect, the class identifier 112 can be compared to the comparator element 116 to determine if the class identifier 112 is within a range or threshold defined by the comparator element 116. As a further example, a script or software can be executed to compare the class identifier 112 to the comparator element 116.

In an aspect, when information sufficient to indicate initiation of a data transmission (e.g. load), such as a file header or page header, a cookie (e.g., parameter) can be incremented. When the file or page associated with the loaded header is completely loaded, the cookie can be decremented. Accordingly, abandonment can be tracked by the gradual increase in a value of the cookie. In another aspect, the cookie can be read on each request for information and if the value exceeds a threshold (e.g., comparator, function, or the like) then the user and/or device can be identified as a user/device that is likely to abandon the page. Thresholds can be defined values such as numerical values (e.g., 10, 20, 30, 35, etc.) or bit strings. Thresholds can be customizable. For example, thresholds can be dependent on data types. As a further example, alternate increment/decrement schemes are contemplated such as incrementing by one for an abandoned data load and decrementing by two for a completed data load. Reset mechanisms can be implemented to return the cookie to a default setting such as zero. As an example, instead of returning the normal file or page, a lightweight page, lower bit rate video, shorter video, smaller data set, or the like can be returned instead. As another example, if interaction with the page (e.g., either via the page remaining open or by clicking a link on the page) is detected, the cookie can be reset, deleted, or decreased by an amount larger than 1. As a further example, there are other parameters that can be used to determine if the user and/or device is an abandonment risk. In an aspect, the total information loads and abandoned loads can be tracked. As such, when a ratio of abandoned loads to total loads exceeds a threshold, alternative information can be transmitted to the requesting device. In another aspect, parameters such as time since last abandoned load, time since last completed load, number of initiated loads, and the like can be used. In a further aspect, a cookie representing a parameter can be reset based upon a particular event such a pre-defined time period.

In an aspect, statistics, such as average and standard deviation, of the load time or other parameters for a user can be tracked. The user can be classified based on the tracked parameters, and different experiences can be provided for different loading behavior associated with one or more users. For example, if a user normally loads the entire page except for advertisements (which generally load last in time), the page presented to the user can be the standard page, but the advertisements can be configured as "light weight" text ads instead of heavier multimedia advertisements. As a further example, a time duration the user stays on the page after the page is loaded can be tracked. For example, if the user stays on the page for only one second after the page completely loads, it can be assumed that the user may intend to abandon the page in the future. If a user stays on the page for a threshold time period (e.g., 20 seconds), it can be assumed that the user is engaged and the light weight page should no longer be presented.

In an aspect, instead of loading a completely different file or page for abandonment risk identified users and/or devices, a portion of the normal page can be loaded first and the remaining portion of the page can be loaded if the user remains on the page for a particular period of time. Information such as the tracked parameters can be used to communicate with the customer in other ways (e.g. email or direct mail) to survey users regarding why the users are leaving the site so quickly. Such follow-up information can be used to provide a custom experience for a particular user and/or device.

Figure 2:
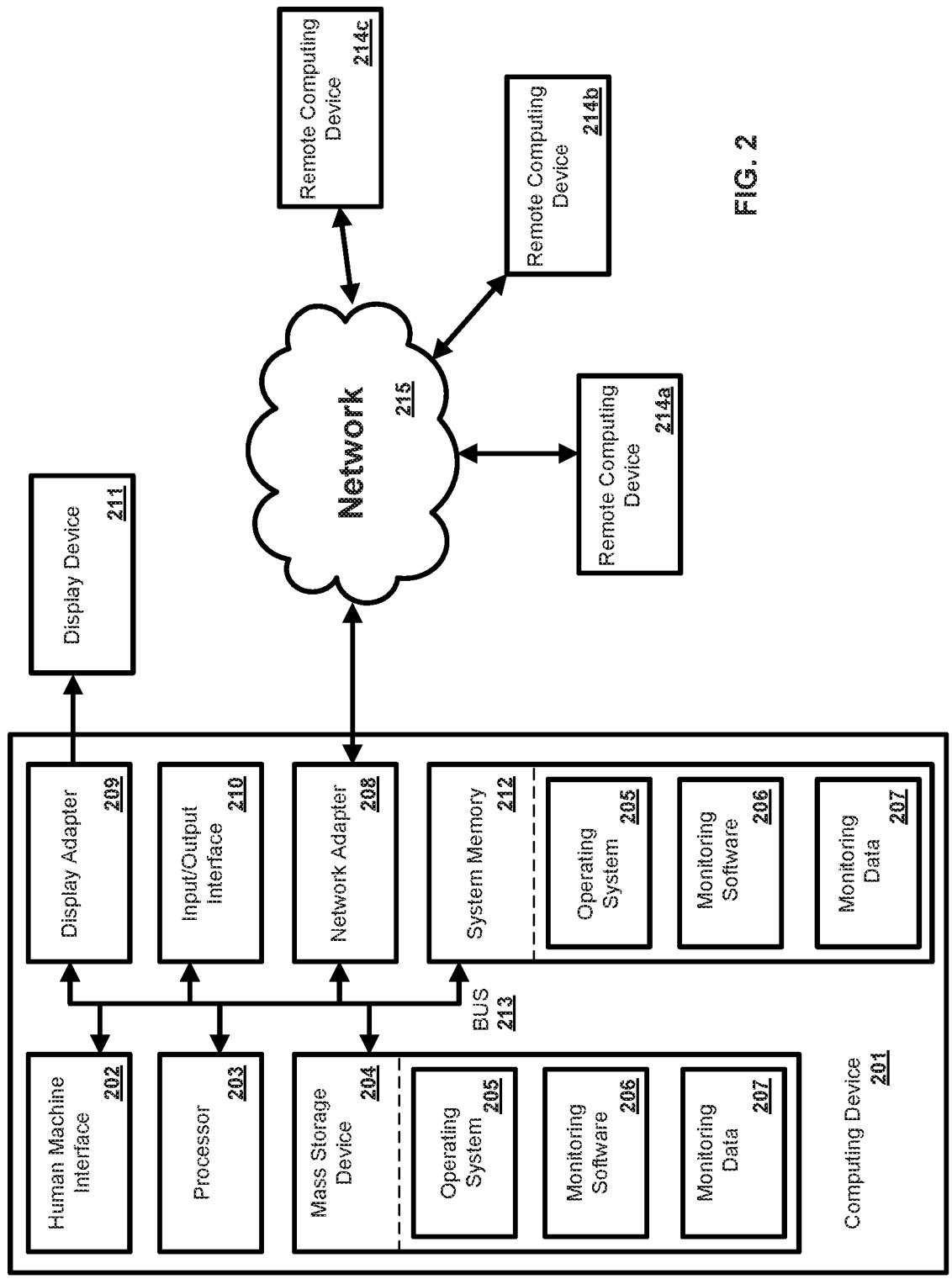
FIG. 2 is a block diagram of an example computing system.

In an example aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, monitoring software 206, monitoring data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Example readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as monitoring data 207 and/or program modules such as operating system 205 and monitoring software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and monitoring software 206. Each of the operating system 205 and monitoring software 206 (or some combination thereof) can comprise elements of the programming and the monitoring software 206. Monitoring data 207 can also be stored on the mass storage device 204. Monitoring data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of monitoring software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
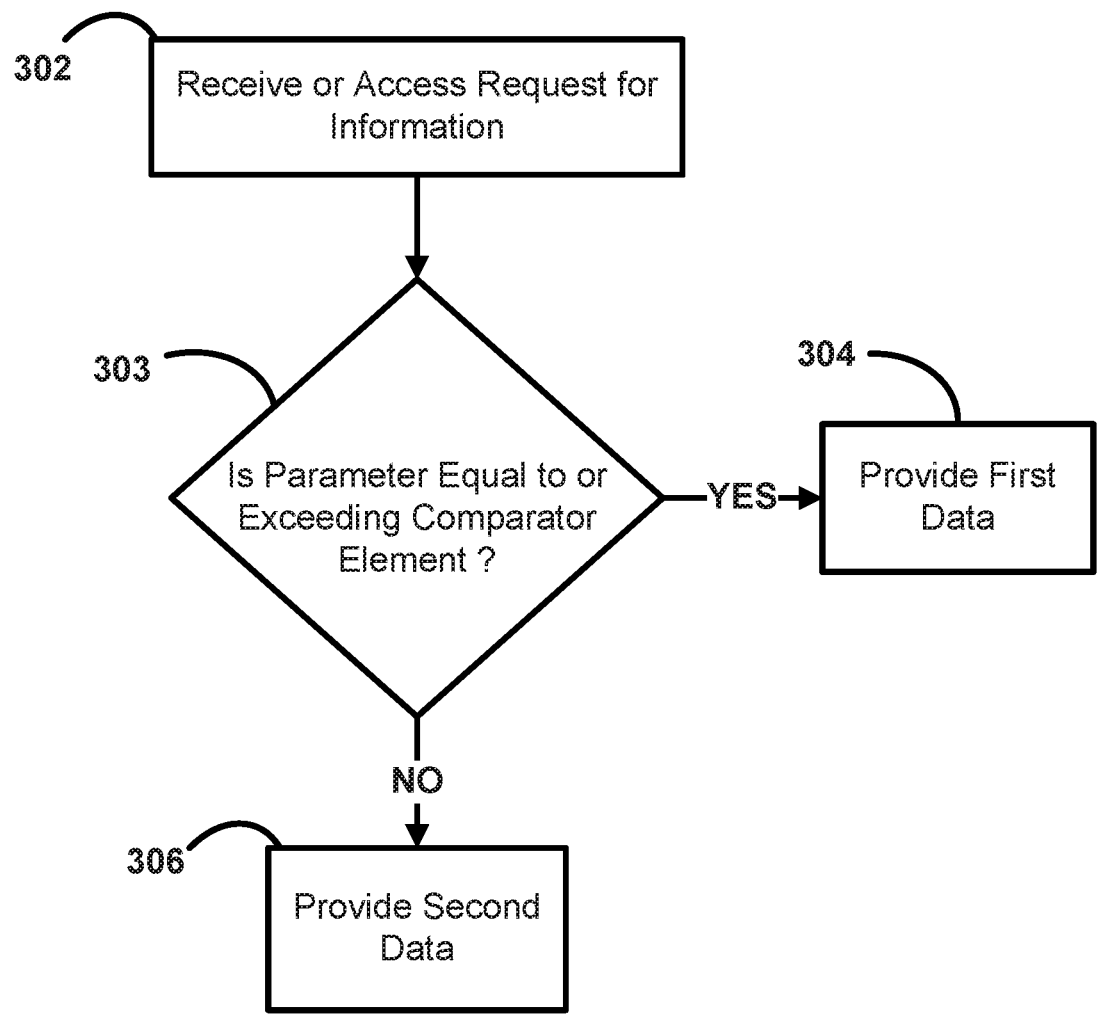
FIG. 3 is a flow chart of an example method.

In an aspect, provided are methods for identifying a class of user and/or device in order to deliver a type of content to each user, based upon a class of user. FIG. 3 illustrates an example method. In step 302, a request for information can be received. In an aspect, the request can comprise an address element such as a uniform resource locator (URL). As an example, one or more users and/or devices can request information such as a data set, file, media, video, audio, web page, or the like.

In step 303, a parameter can be compared to a comparator element. In an aspect, the parameter can relate to the request for information. In another aspect, the parameter can be based on one or more of initiated data loads, abandoned data loads, and complete data loads. As an example, the parameter can comprise a ratio involving of one or more of initiated data loads, abandoned data loads, and complete data loads. As another example, the parameter can relate to types of information such as data format, video content, web content, and the like. As a further example, the parameter can relate to whether a particular information has been transmitted or received by a particular device. In a further aspect, the comparator element can comprise one or more of a function, value, token, character, character string, label, classifier, pre-determined time period, pre-determined date, time range, finite expression, or the like. The comparator element can comprise single or multiple functions, characters, character strings, ranges, thresholds, values, and the like, for comparison. The comparator element can be based upon a pre-defined function, user attributes, user authority, user history, user location, or other classification or distinction.

In an aspect, when information sufficient to indicate initiation of a data load, such as a file header or page header, the parameter can be incremented. When the file or page associated with the loaded header is completely loaded, the cookie can be decremented. Accordingly, abandonment can be tracked by the gradual increase in a value of the cookie. In another aspect, the cookie can be read on each request for information and if the value exceeds a threshold (e.g., comparator element, function, or the like) then the user and/or device can be identified as a user/device that is likely to abandon the page. Thresholds can be defined values such as numerical values (e.g., 10, 20, 30, 35, etc.) or bit strings. Thresholds can be customizable. For example, thresholds can be dependent on data types. As a further example, alternate increment/decrement schemes are contemplated such as incrementing by one for an abandoned data load and decrementing by two for a completed data load. Reset mechanisms can be implemented to return the cookie to a default setting such as zero. As an example, instead of returning the normal file or page, a lightweight page, lower bit rate video, shorter video, smaller data set, or the like can be returned instead. As another example, if interaction with the page (e.g., either via the page remaining open or by clicking a link on the page) is detected, the cookie can be reset, deleted, or decreased by an amount larger than 1. As a further example, there are other parameters that can be used to determine if the user and/or device is an abandonment risk. In an aspect, the total information loads and abandoned loads can be tracked. As such, when a ratio of abandoned loads to total loads exceeds a threshold, alternative information can be transmitted to the requesting device. In another aspect, parameters such as time since last abandoned load, time since last completed load, number of initiated loads, and the like can be used. In a further aspect, a cookie representing a parameter can be reset based upon a particular event such a pre-defined time period.

In an aspect, statistics, such as average and standard deviation, of the load time or other parameters for a user can be tracked. The user can be classified based on the tracked parameters, and different experiences can be provided for different loading behavior associated with one or more users. For example, if a user normally loads the entire page except for advertisements (which generally load last in time), the page presented to the user can be the standard page, but the advertisements can be configured as "light weight" text ads instead of heavier multimedia advertisements. As such, "light weight" advertisements can be loaded first in time to maximize exposure to users before the user navigates away from the advertisement. Other content such as reward offers for viewing information such as advertisements can be presented to user identified as abandonment risks. As a further example, a time duration the user stays on the page after the page is loaded can be tracked. For example, if the user stays on the page for only one second after the page completely loads, it can be assumed that the user may intend to abandon the page in the future. If a user stays on the page for a threshold time period (e.g., 30 seconds), it can be assumed that the user is engaged and the light weight page should no longer be presented.

In step 304, first data can be provided. In an aspect, first data can be provided in response to the request. In another aspect, first data can be conditionally provided if a parameter is equal to or exceeds a comparator element. As an example, the first data can comprise web content such as a web page and/or information comprises in a web page. As a further example, the first data can be a file, media, video, audio, content asset, or the like.

In step 306, second data can be provided. In an aspect, second data can be provided in response to the request. In another aspect, second data can be conditionally provided if the comparator element exceeds the parameter (e.g., the parameter is less than the comparator). As an example, the second data can comprise web content such as a web page and/or information comprises in a web page. In an aspect, the first data can have a different data size compared to the second data. As an example, the second data can be a file, media, video, audio, content asset, or the like. As a further example, the second data can have different characteristics than the first data such as different bitrate, file size, duration, resolution, and the like.

The user can be classified based on the tracked parameters, and different experiences can be provided for different loading behavior associated with one or more users. For example, if a user normally loads the entire page except for advertisements (which generally load last in time), the page presented to the user can be the standard page, but the advertisements can be configured as "light weight" text ads (e.g., first data) instead of heavier multimedia advertisements (e.g. second data). As such, advertisements can be loaded in a timely manner to maximize exposure to users before the user navigates away from the advertisement. As a further example, a time duration the user stays on the page after the page is loaded can be tracked. For example, if the user stays on the page for only three second after the page completely loads, it can be assumed that the user may intend to abandon the page in the future. As such, select information can be presented first in time to maximize exposure to the user before the user navigates away from the page. If a user stays on the page for a threshold time period (e.g., 60 seconds), it can be assumed that the user is engaged and the light weight page (e.g., first data) should no longer be presented.

Figure 4:
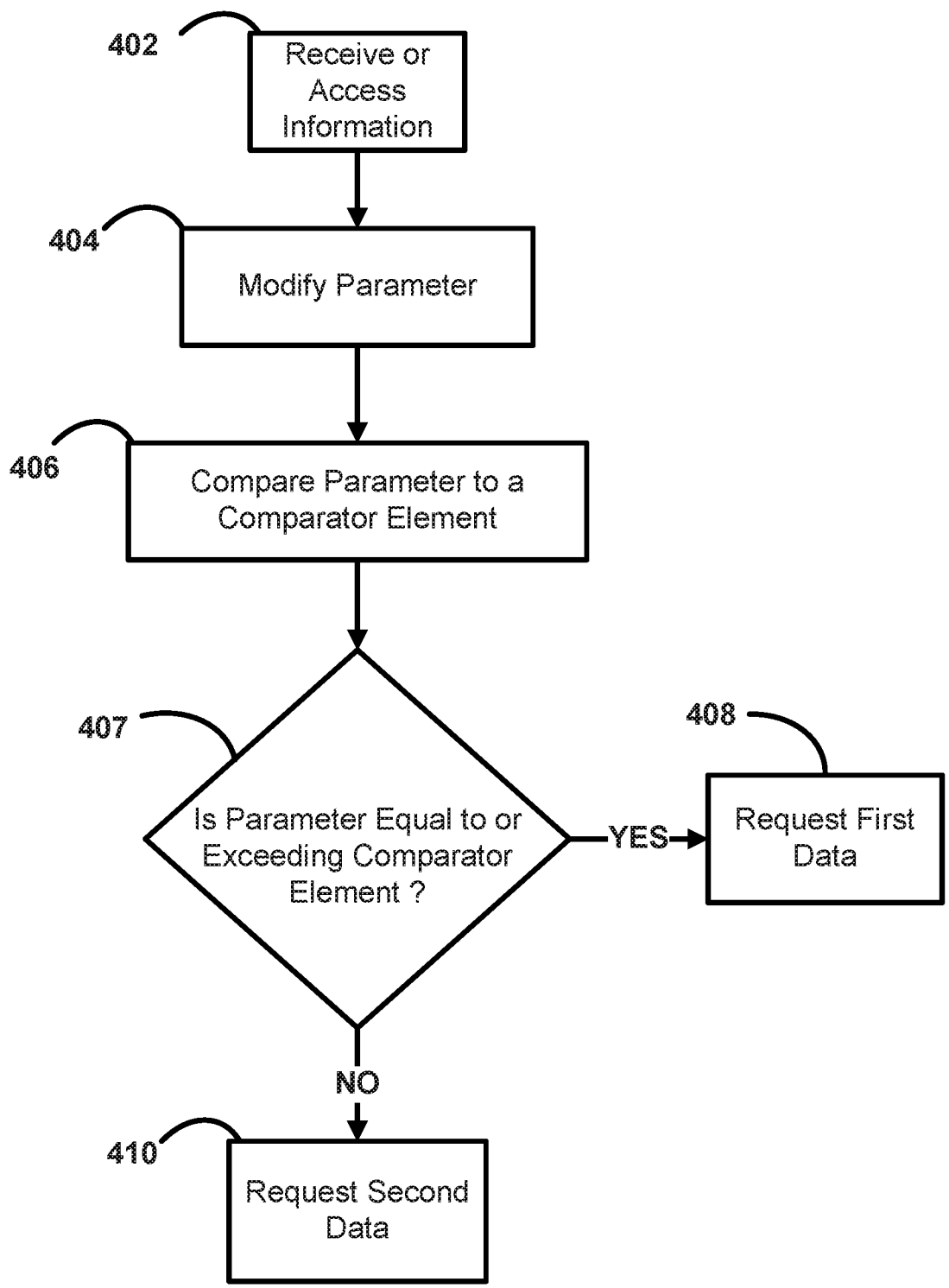
FIG. 4 is a flow chart of an example method.

FIG. 4 illustrates an example method. In step 402, information can be received. In an aspect, the received information can relate to one or more of initiated data loads, abandoned data loads, and completed data loads. In another aspect, the received information can relate to the receipt of one or more web pages, headers, metadata, data sets, files, media, video, audio, or the like.

In step 404, a parameter can be modified based upon the received information. In an aspect, the parameter can be incremented and/or decremented based upon the received information. As an example, the parameter can comprise a cookie, a function, a character string, or a combination thereof.

In an aspect, when information sufficient to indicate initiation of a data load, such as a file header or page header, the parameter can be incremented. When the file or page associated with the loaded header is completely loaded, the cookie can be decremented. Accordingly, abandonment can be tracked by the gradual increase in a value of the cookie. In another aspect, the cookie can be read on each request for information and if the value exceeds a threshold (e.g., comparator element, function, or the like) then the user and/or device can be identified as a user/device that is likely to abandon the page. Thresholds can be defined values such as numerical values (e.g., 10, 20, 30, 35, etc.) or bit strings. Thresholds can be customizable. For example, thresholds can be dependent on data types. As a further example, alternate increment/decrement schemes are contemplated such as incrementing by one for an abandoned data load and decrementing by two for a completed data load. Reset mechanisms can be implemented to return the cookie to a default setting such as zero. As an example, instead of returning the normal file or page, a lightweight page, lower bit rate video, shorter video, smaller data set, or the like can be returned instead. As another example, if interaction with the page (e.g., either via the page remaining open or by clicking a link on the page) is detected, the cookie can be reset, deleted, or decreased by an amount larger than 1. As a further example, there are other parameters that can be used to determine if the user and/or device is an abandonment risk. In an aspect, the total information loads and abandoned loads can be tracked. As such, when a ratio of abandoned loads to total loads exceeds a threshold, alternative information can be transmitted to the requesting device. The alternative content may be customized to entice the user not to abandon the page. For example, the alternative content may be faster loading content, thereby presenting information to a user in a timely manner. As a further example, the alternative content may be a particular feature of interest (e.g., based on historical interactions) or an offer or reward for allowing the data to complete transfer. In another aspect, parameters such as time since last abandoned load, time since last completed load, number of initiated loads, and the like can be used. In a further aspect, a cookie representing a parameter can be reset based upon a particular event such a pre-defined time period. In another aspect, statistics, such as average and standard deviation, of the load time or other parameters for a user can be tracked.

In step 406, a parameter can be compared to a comparator element. In an aspect, the parameter can relate to the request for information. In another aspect, the parameter can relate to one or more of initiated data loads, abandoned data loads, and complete data loads (e.g., historical or predicted data related to such data functions). As an example, the parameter can comprise a ratio of one or more of initiated data loads, abandoned data loads, and complete data loads. As another example, the parameter can relate to receiving information such as data, content, web content, and the like. In a further aspect, the comparator element can comprise one or more of a function, value, token, character, character string, label, classifier, pre-determined time period, pre-determined date, time range, finite expression, or the like. The comparator element can comprise single or multiple functions, characters, character strings, ranges, thresholds, values, and the like, for comparison. The comparator element can be based upon a pre-defined function, user level, user authority, user history, user location, or other classification or distinction. In step 407, it can be determined whether the parameter equals, is less than, or exceeds the comparator element.

In step 408, first data can be processed (e.g., requested, loaded, received, transmitted, modified, etc.) if the parameter is equal to or exceeds the comparator element. In an aspect, first data can be provided in response to a request. As an example, the first data can comprise web content such as a web page and/or information comprises in a web page. As a further example, the first data can be a file, media, video, audio, content asset, or the like.

In step 410, second data can be (e.g., requested, loaded, received, transmitted, modified, etc.) if the comparator element exceeds the parameter. In an aspect, second data can be provided in response to a request. As an example, the second data can comprise web content such as a web page and/or information comprising a web page. In an aspect, the first data can have a different data size compared to the second data. As an example, the second data can be a file, media, video, audio, content asset, or the like. As a further example, the second data can have different characteristics from the first data such as different bitrate, file size, duration, resolution, and the like.

The user can be classified based on the tracked parameters, and different experiences can be provided for different loading behavior associated with one or more users. For example, if a user normally allows transmission of entire data set, file, webpage, or the like, except for advertisements (which generally load last in time), the data presented to the user can be the standard version, but the advertisements can be configured as "light weight" text ads (e.g., first data) instead of heavier multimedia advertisements (e.g. second data). As another example, the data presented to the user can be the standard version, but the images and/or videos can be removed to minimize required processing time (e.g., transfer time, load time, etc.). As another example, first data can comprise a light weight version (e.g., having smaller data size or required transfer/load time relative to a second standard or default version) of a content item, such as a file, video, webpage, etc. As such, the light weight version can be loaded, thereby allowing the user to interact with the content item rather than abandoning. As a further example, a time duration the user stays on the page after the page is loaded can be tracked. For example, if the user stays on the page for only one second after the page completely loads, it can be assumed that the user may intend to abandon the page in the future. If a user stays on the page for a threshold time period (e.g., 20 seconds), it can be assumed that the user is engaged and the light weight page (e.g., first data) should no longer be presented.

Figure 5:
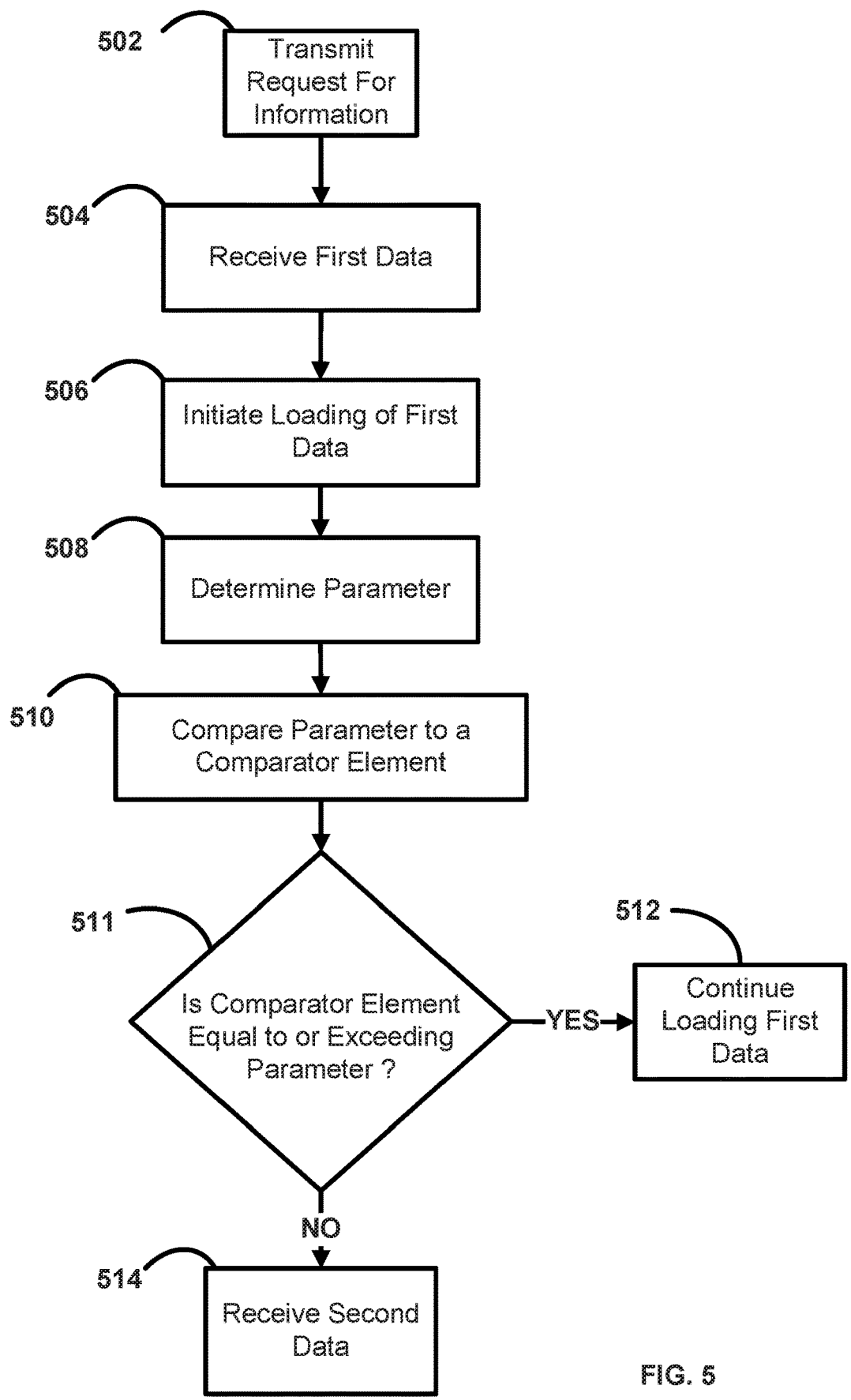
FIG. 5 is a flow chart of an example method.

FIG. 5 illustrates an example method for managing data. In step 502, a request for information can be transmitted. In an aspect, the request can comprise an address element such as a uniform resource locator (URL). As an example, one or more users and/or devices can request information such as a one or more web pages, headers, metadata, data sets, files, media, video, audio, or the like.

In step 504, first data can be received. In an aspect, first data can be received in response to the request. As an example, the first data can comprise web content such as a web page and/or information comprised in a web page. As a further example, the first data can comprise a portion of a complete asset such as a file, web page, data set, or the like.

In step 506, first data can be initially loaded. In an aspect, at least a portion of the first data can be loaded. As an example, at least a portion of the first data can be processed to present content to a user based on the processed portion of the first data. As a further example, the first data can be a web page, file, media, video, audio, content asset, or the like.

In step 508, a parameter relating to the first data can be determined. In an aspect, the parameter can relate to the request for information. In another aspect, the parameter can comprise one or more of initiated data loads, abandoned data loads, and complete data loads. As an example, the parameter can comprise a ratio of one or more of initiated data loads, abandoned data loads, and complete data loads. As another example, the parameter can relate to receiving information, such as data, content, web content, and the like. As a further example, the parameter can comprise a cookie, a function, a character string, or a combination thereof.

In step 510, a parameter can be compared to a comparator element. In a further aspect, the comparator element can comprise one or more of a function, value, token, character, character string, label, classifier, pre-determined time period, pre-determined date, time range, finite expression, or the like. The comparator element can comprise single or multiple functions, characters, character strings, ranges, thresholds, values, and the like, for comparison. The comparator element can be based upon a pre-defined function, user level, user authority, user history, user location, or other classification or distinction. In step 511, it can be determined whether the parameter equals, is less than, or exceeds the comparator element.

In step 512, loading of the first data is continued if the comparator element is equal to or exceeds the parameter. In step 514, second data is received if the parameter exceeds the comparator element. As an example, the first data set has a smaller data size compared to the second data set. As another example, the first data set has an estimated load time that is lower than an estimated load time for the second data set. As a further example, the second data set comprises a content update (e.g., higher definition data, supplemental information, advanced features, etc.) for the first data set. In an aspect, the second data can be a file, media, video, audio, content asset, or the like. As a further example, the second data can have different characteristics from the first data such as different bitrate, file size, duration, resolution, and the like. In another aspect, if a user normally allows transmission of entire data set, file, webpage, or the like, except for advertisements (which generally load last in time), the data presented to the user can be the standard version, but the advertisements can be configured as "light weight" text ads (e.g., first data) instead of heavier multimedia advertisements (e.g. second data). As another example, preferred or most-used features of a particular data set (e.g., webpage, interface, etc.) can be presented as the first content. As such, if the user allows full transfer of the first data, additional features, options, interface elements, and the like can be provided as the second data. As a further example, if a user consistently navigates to an account page associated with a service provider's web site, the service provider's web site can be customized to render the account page option(s) first in time. If the user remains on the web site, other options, such as informational options, tools, or utilities can be rendered. In a further aspect, a low resolution version of a data set can be transmitted and/or presented first in time. If a user allows the full transfer of the low resolution version of the data set, a higher resolution data set (e.g., replacement or supplemental to the first data set) can then automatically load.

Figure 6:
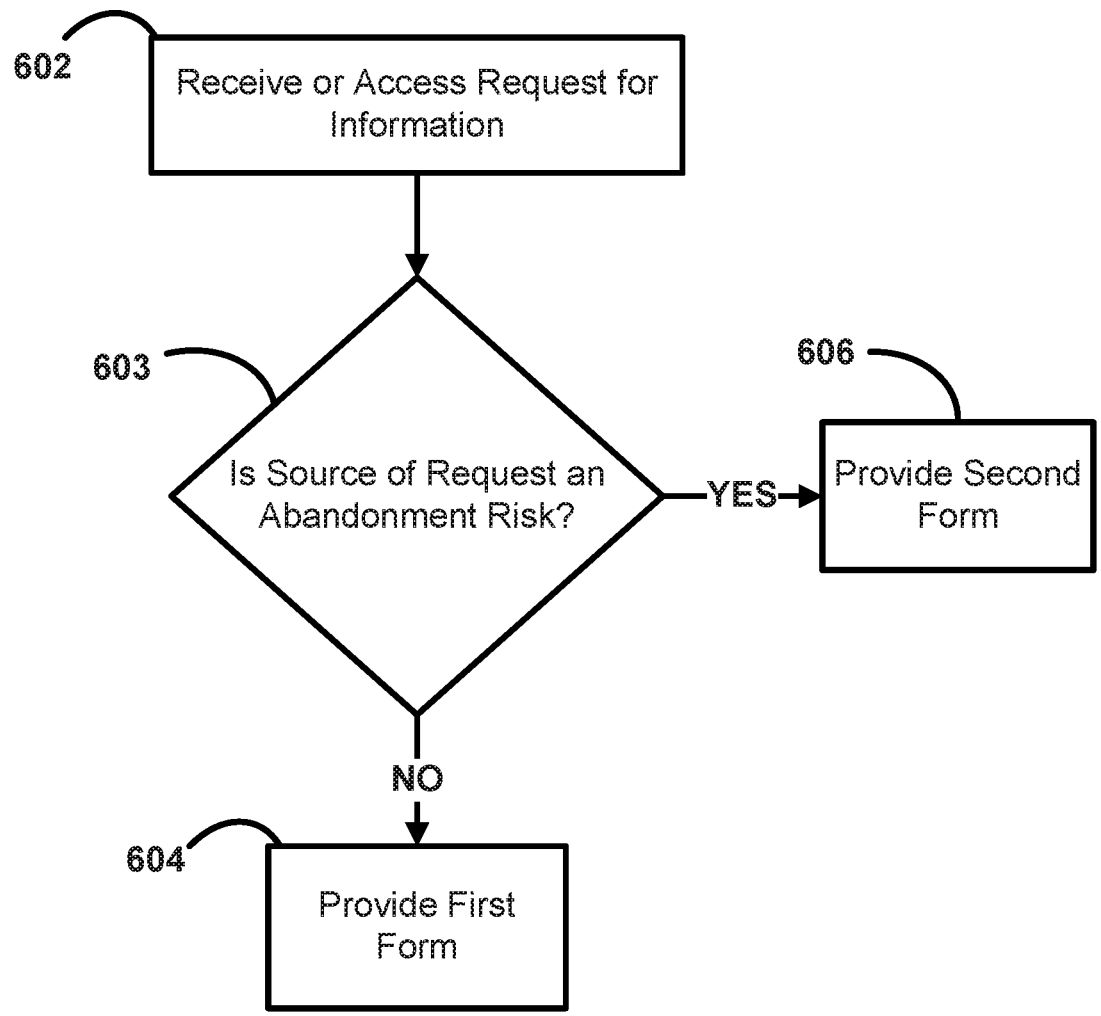
FIG. 6 is a flow chart of an example method.

FIG. 6 illustrates an example method for presenting content. In step 602, one or more requests for information can be received. In an aspect, the request can be associated with an identifier. In another aspect, the first request can comprise an address element, such as a uniform resource locator (URL). As an example, the requested information can have a first form and a second form. In an aspect, the first form can have a different data size compared to the second form. As an example, the first form and/or the second form can be a file, media, video, audio, content asset, or the like. As a further example, the second form can have different characteristics from the first form such as different bitrate, file size, duration, resolution, and the like. As a further example, one or more users and/or devices can request information such as one or more web pages, headers, metadata, data sets, files, media, video, audio, or the like.

In step 603, it can be determined whether the source of the one or more requests is an abandonment risk. An abandonment risk can relate to the likelihood that a particular user or device may abandon transmission or loading of data before the intended complete data set is transmitted or loaded. An abandonment risk can relate to the likelihood that a particular user or device may navigate away from a file, such as a web page, prior to loading the complete file. In an aspect, abandonment risk can be determined by comparing a parameter to a comparator element. In an aspect, the parameter can relate to the request for information. In another aspect, the parameter can comprise one or more of initiated data loads, abandoned data loads, and complete data loads. As an example, the parameter can comprise a ratio of one or more of initiated data loads, abandoned data loads, and complete data loads. As another example, the parameter can relate to receiving information such as data, content, web content, and the like. In a further aspect, the comparator element can comprise one or more of a function, value, token, character, character string, label, classifier, predetermined time period, predetermined date, time range, finite expression, or the like. The comparator element can comprise single or multiple functions, characters, character strings, ranges, thresholds, values, and the like, for comparison. The comparator element can be based upon a pre-defined function, user level, user authority, user history, user location, or other classification or distinction.

If the source of the request is not an abandonment risk, the first form of the information can be provided in response to the first request, at 604. If the source of the request is determined to be an abandonment risk, the second form of the information can be provided in response to the first request, at 606. As an example, the first form has a different data size compared to the second form. As another example, the second form is provided as an alternative to the first form, such as alternative formats, resolutions, file size, enabled features, etc. As a further example, the second form is provided as a supplement (e.g., higher definition data, supplemental information, advanced features, etc.) relating to the first form.

Figure 7:
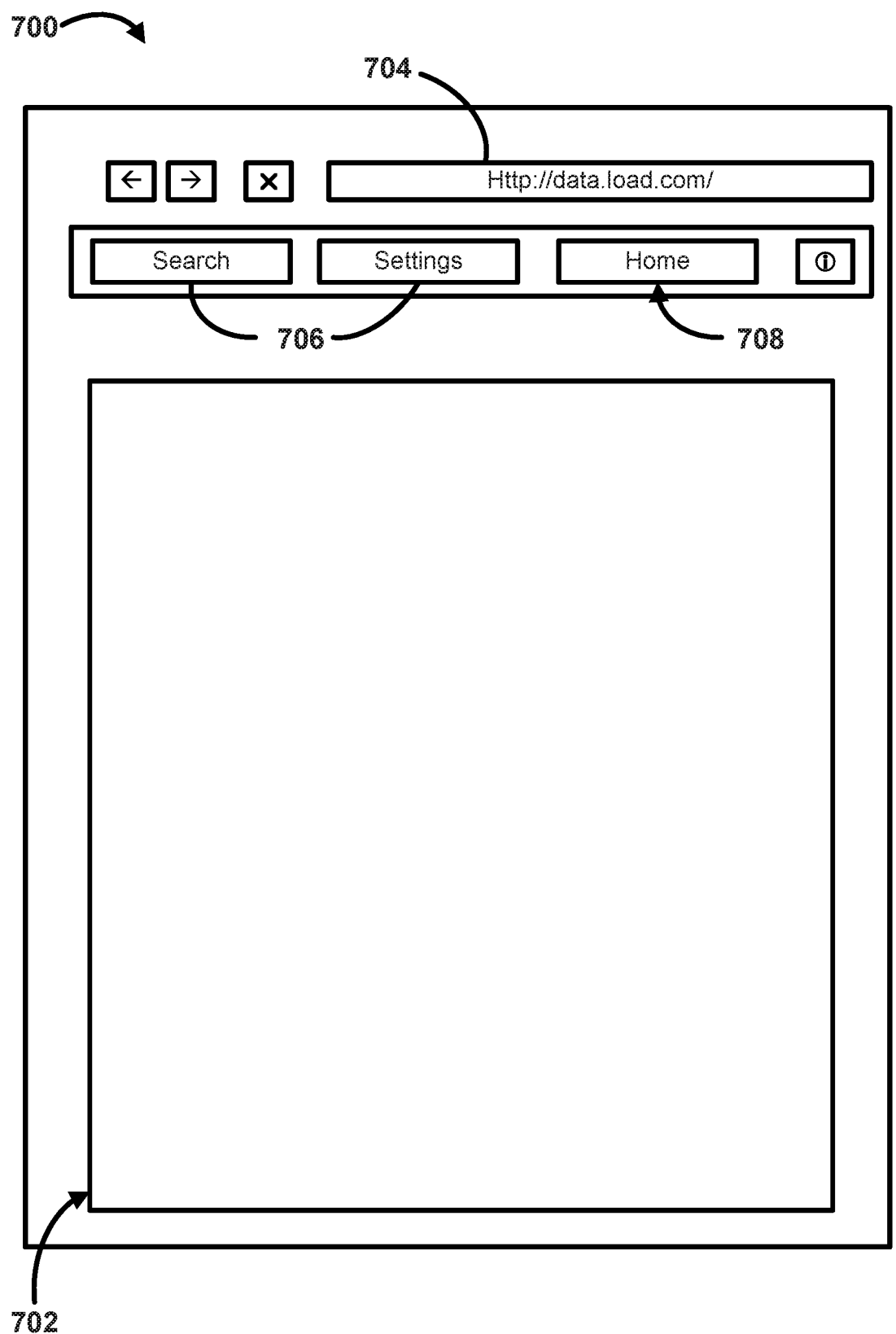
FIG. 7 is a representation of a web browser.

In an aspect, software can be used to implement methods of identifying a class of user. As described in greater detail below, the methods and systems can comprise a software interface 700, as illustrated in FIG. 7. By way of example, the interface 700 can be integrated with the web browser 106 (FIG. 1). As a further example, the interface 700 can be loaded to the user device 102 as an add-on software package. In an aspect, the loading of the interface 700 can be tracked in order to identify the user devices that comprise the interface 700.

The methods and systems disclosed can utilize one or more interfaces 700 to perform one or more functions in one or more locations. FIG. 7 illustrates an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

In an aspect, the interface 700 can comprise a browser window 702 for displaying information (e.g. web pages, files, etc.) to the user. As an example, the interface 700 can comprise an address bar 704 or URL bar to allow a user to input a URL for directing the requests of the interface 700. In an aspect, the interface 700 can be a toolbar disposed adjacent the address bar 704 of the interface 700 and including one or more user interface elements, buttons, or engageable menus. The interface 700 can be presented to the user in any position, form, and environment. As an example, the interface 700 can comprise a plurality of user interface elements such as user-engageable buttons 706 for executing various associated functions (e.g. search function, settings modification, and the like.)

In an aspect, the interface 700 can comprise a user interface element such as home button 708 or a homepage button for directing the web browser 106 to a pre-defined file or webpage associated with the home button 708. As an example, the address element 110 and class identifier 112 are associated with the home button 708, whereby a selection of the home button 708 causes the interface 700 to request a particular file associated with the address element 110 and the class identifier 112. The home button 708 can be any bookmark or the like associated with any data, file, webpage, or the like.

In an aspect, when the home button 708 is selected (or a page is requested), the class identifier 112 can be compared to the comparator element 116. In an aspect, the comparator element 116 represents a time period and the class identifier 112 is compared to the time period to determine if the class identifier 112 is within the time period represented by the comparator element 116. The class identifier 112 and the comparator element 116 can relate to any parameter such as abandonment risk, data load history, preferences, and the like. As an example, if the class identifier 112 is within the comparator element 116, the web browser 106 can retrieve a particular file and can provide a first experience to the user. As a further example, if the class identifier 112 is outside the comparator element 116, the web browser 106 can retrieve a particular file and can provide a second experience to the user, different from the first experience. In this way, the class identifier 112 can be relied upon to determine the experience of the user. The comparator element 116 and class identifier 112 can be defined to distinguish any grouping, categorization, or classification of user in order to deliver a unique experience for each class of user.

In an aspect, content can be presented to a user. The content can comprise an advertisement. As such, if a user skips the advertisement, the class identifier 112 can be incremented similar to an abandoned data load. Accordingly, modified content such as shorter advertisements or overlaid advertisements can be presented to users having class identifiers 112 that exceed a threshold. In another aspect, a user can invoke control actions during the presentation of content. For example, a user can fast forward playback or mute audio of content playback during the presentation of an advertisement. Such control actions can cause a modification, such as incrementing or decrementing, in the class identifier 112. Accordingly, modified content can be presented to users having class identifiers 112 that exceed a threshold.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, from a computing device, a request for a data file comprising text content and multimedia content, wherein the request comprises an identifier of the computing device;
   determining, based on the identifier, that a parameter related to requests from the computing device for the data file, does not satisfy a threshold;
   sending, based on determining that the parameter does not satisfy the threshold, the text content;
   incrementing, based on determining that the text content completely loaded, the parameter;
   sending, based on determining that the incremented parameter satisfies the threshold, the multimedia content; and
   adjusting the parameter, wherein the parameter is decremented when loading of the multimedia content is abandoned and the parameter is incremented when loading of the multimedia content is completed.

2. The method of claim 1, wherein sending the text content comprises sending a version of the data file comprising the text content.

3. The method of claim 1, wherein sending the multimedia content comprises sending a version of the data file comprising the multimedia content.

4. The method of claim 1, wherein the parameter is further related to abandoned data file loads associated with the computing device and to completed data file loads associated with the computing device.

5. The method of claim 4, wherein the parameter comprises a time based relationship between the abandoned data file loads and the completed data file loads.

6. The method of claim 4, wherein the parameter comprises a ratio of one or more of initiated data file loads, the abandoned data file loads, or the completed data file loads.

7. The method of claim 1, wherein the request comprises one or more of an address element, or a uniform resource locator (URL).

8. The method of claim 1, wherein a load time associated with the multimedia content is longer than a load time associated with the text content.

9. The method of claim 1, wherein the parameter is further related to whether particular information has been transmitted or received.

10. A method comprising:
   receiving a first request from a computing device for a data file comprising text content and multimedia content, wherein the first request comprises an identifier of the computing device;
   determining, based on the identifier, that a parameter related to requests from the computing device for the data file satisfies a threshold;
   sending, based on determining that the parameter satisfies the threshold, the multimedia content;
   decrementing, based on determining that loading the multimedia content was abandoned, the parameter;
   receiving a second request from the computing device for the data file;
   determining that the decremented parameter does not satisfy the threshold;
   sending, based on determining that the decremented parameter does not satisfy the threshold, the text content; and
   adjusting the parameter, wherein the parameter is decremented when loading the text content is abandoned and the parameter is incremented when loading the text content is completed.

11. The method of claim 10, wherein sending the multimedia content comprises sending a version of the data file comprising the multimedia content.

12. The method of claim 10, wherein sending the text content comprises sending a version of the data file comprising the text content.

13. The method of claim 10, wherein the parameter is further related to abandoned data file loads associated with the computing device and to completed data file loads associated with the computing device.

14. The method of claim 13, wherein the parameter comprises a time based relationship between the abandoned data file loads and the completed data file loads.

15. The method of claim 13, wherein the parameter comprises a ratio of one or more of initiated data file loads, the abandoned data file loads, or the completed data file loads.

16. The method of claim 10, wherein the first request comprises one or more of an address element, or a uniform resource locator (URL).

17. The method of claim 10, wherein a load time associated with the multimedia content is longer than a load time associated with the text content.

18. The method of claim 10, wherein the parameter is further related to whether particular information has been sent or received.

19. An apparatus comprising:
   one or more processors; and
   memory storing processor executable instructions that, when executed by the one or more processors, cause the apparatus to:
      receive, from a computing device, a request for a data file comprising text content and multimedia content, wherein the request comprises an identifier of the computing device;
      determine, based on the identifier, that a parameter related to requests from the computing device for the data file, does not satisfy a threshold;
      send, based on the parameter not satisfying the threshold, the text content;
      increment, based on the text content completely loading, the parameter;
      send, based on the incremented parameter satisfying the threshold, the multimedia content; and
      adjust the parameter, wherein the parameter is decremented when loading the multimedia content is abandoned and the parameter is incremented when loading the multimedia content is completed.

20. The apparatus of claim 19, wherein the parameter is further related to abandoned data file loads associated with the computing device and to completed data file loads associated with the computing device.

* * * * *